United States Patent
Colemon

(10) Patent No.: US 6,829,335 B2
(45) Date of Patent: Dec. 7, 2004

(54) CALL HANDLING FOR MULTIPLE USERS OF AN AUTOMATED ATTENDANT

(75) Inventor: James M. Colemon, Buffalo, NY (US)

(73) Assignee: Intel Corporation, Santa Clara, CA (US)

(*) Notice: Subject to any disclaimer, the term of this patent is extended or adjusted under 35 U.S.C. 154(b) by 176 days.

(21) Appl. No.: 09/965,903

(22) Filed: Sep. 28, 2001

(65) Prior Publication Data

US 2003/0068019 A1 Apr. 10, 2003

(51) Int. Cl.[7] .................................. H04M 1/64
(52) U.S. Cl. ......................... 379/88.22; 379/207.14
(58) Field of Search ........................... 379/67.1, 88.2, 379/88.22, 88.23, 156, 157, 164, 201.01, 201.07, 207.14, 214.01

(56) References Cited

U.S. PATENT DOCUMENTS

| | | | | |
|---|---|---|---|---|
| 4,811,381 A | * | 3/1989 | Woo et al. ............... | 379/88.19 |
| 5,450,488 A | * | 9/1995 | Pugaczewski et al. ..... | 379/67.1 |
| 5,535,270 A | * | 7/1996 | Doremus et al. ......... | 379/266.01 |
| 5,729,600 A | * | 3/1998 | Blaha et al. ........... | 379/266.07 |
| 5,978,451 A | * | 11/1999 | Swan et al. ............... | 379/88.24 |

* cited by examiner

Primary Examiner—Scott L. Weaver
(74) Attorney, Agent, or Firm—Alan L. Pedersen-Giles

(57) ABSTRACT

The present invention allows an automated telephone attendant and a voice mail system to be shared among a plurality of users and tenants without duplicating tables stored at the switch in the voice mail system. In an automated attendant embodiment, the invention can include a port to receive an incoming call, the call having a called number associated with one of a plurality of users, an input to receive a user identification for the incoming call and a greeting storage to contain stored greetings retrievable based on the received identification. The invention further includes a telephone circuit interface of the port to answer the incoming call, and a playback device to play a retrieved greeting for the answered call based on a received user identification. In a switch embodiment, the invention can include an external telephone line interface to receive an incoming call having a called number, a user identification look up table to identify one of a plurality of users for the incoming call based on the called number, a switching circuit to route the incoming call to a port of an automated attendant system that is shared by the plurality of users, and a digital interface to send the user identification to the automated attendant system in association with the routed call.

24 Claims, 5 Drawing Sheets

CALL HANDLING FOR MULTIPLE USERS OF AN AUTOMATED ATTENDANT

FIELD OF THE INVENTION

The present invention relates to the field of handling calls for an automated attendant or a voice mail system that is shared by multiple users. More particularly, the invention relates to transferring information about the user to whom a call is directed from a switch that receives the call to the automated attendant or voice mail system.

BACKGROUND

Frequently several users or tenants will share a telephone switch (such as a private branch exchange, PBX, or key service unit, KSU) and a voice mail system in order to reduce expenses. The users and the tenants of the switch and voice mail may be in the same building or facility or may be in different locations. To share the switch, the users will normally purchase several telephone lines to connect the switch to the public telephone company's Central Office, CO. This allows several external or outside telephone connections to be maintained by the switch at the same time. The telephone lines will have one or more external telephone numbers that are typically divided up between the users and grouped for the tenants for exclusive use by the users of each respective tenant. The assignments of the telephone numbers to each tenant and to each user is normally maintained as a table at the switch.

Incoming calls will be received by the switch and matched to a particular one of users and a particular one of the tenants based on the corresponding telephone number or telephone line. Based on this identification, the switch can route the call to a particular one or more telephone terminals, to a receptionist terminal, or to an automated attendant. The mapping between telephone numbers and internal telephone terminals can be set by the tenants as they desire and is maintained also in a table at the switch.

The voice mail system also receives its calls from the switch. If there is an automated attendant either as part of the voice mail, instead of the voice mail, or as a stand-alone system, it also receives its calls from the switch. External calls can come as forwarded from unanswered, busy, or "do not disturb" internal extensions. External calls can also come directly from the outside if the voice mail system's auto-attendant feature is supposed to handle the call routing in place of a live receptionist. The voice mail system will answer the call with a greeting assigned to the particular internal extension (in the case of a forwarded call; sometimes referred to as a mailbox or personal greeting) or to the particular tenant to which the extension belongs (in the case of an auto-attendant call; sometimes referred to as a system or company greeting). The greeting can be set by each tenant to suit the taste and style desired by the tenant. A basic example of a system or company greeting might typically be something like, "welcome to Intel; no one is available to answer your call; if you know your party's extension; please dial it now; otherwise, you may leave a message after the tone."

In order to play a greeting, the voice mail system needs, in the first case to know the internal extension number for which the call was intended, and in the second case, the tenant to which the call was directed. This information is available to the switch which received the original call and which maintains the tables that map external telephone lines to tenants and to internal extension numbers. If the switch has transferred the call to several different internal extension numbers, the switch will also know the history of the transfers. In some systems, when a call is forwarded to the voice mail system, the switch also sends an indication of the internal extension from which the call was forwarded. In some systems, if the call is routed directly to voice mail (i.e. the voice mail system is in auto-attendant mode), the switch will instead send an indication of the external telephone number on which the call originated.

The internal extension information can be used by the voice mail system to determine which greeting to play but only if the voice mail system has a duplicate of the mapping tables maintained by the switch. Duplicating the tables requires either that the user create both tables or that an automated maintenance routine be created to ensure that the voice mail tables are always synchronized.

In some systems, the voice mail system has a set of ports for incoming calls and the switch can transfer a call to any available port. Tenants or internal extension numbers are mapped to particular voice mail ports using a table maintained by the switch. When a call comes into any one of the voice mail ports, the voice mail system can select the appropriate greeting based on the voice mail port on which the call was received. This approach also requires that a table to map ports to tenants or individual extension numbers be maintained by the voice mail system and that the table be kept synchronized with the switch. It also requires that a fixed set of voice mail ports be allocated to each tenant or to each user. As a result, the flexibility of the voice mail ports is reduced. If one tenant's voice mail ports are all in use, then that tenant cannot receive any further voice mail calls even if another tenant has unused voice mail ports.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

In the present invention, the voice mail system does not need to maintain or synchronize any tables that map telephone lines or extension numbers to tenants or users. There is also no need for particular voice mail ports to be allocated to particular tenants. The voice mail simply needs a tenant identification number for each tenant greeting or a user identification number for each user greeting. This not only simplifies the voice mail system, it increases its capacity with a given number of voice mail ports, and it improves accuracy by eliminating the requirement to synchronize data between the switch and the voice mail.

In the present invention, a user or a tenant identification is passed from the switch to the voice mail. The tenant ID is generated by the switch based on external or internal telephone or line numbers using the tables maintained at the switch. The tenant ID is used by the voice mail to select the appropriate greeting that has been set or selected by the corresponding user or tenant. As a result, the call can be routed to any voice mail port and the tenants can reprogram external and internal telephone lines at the switch without any concern for the voice mail system.

In another embodiment, a user identification is passed from the switch to the voice mail. The user identification uniquely identifies a user to the voice mail system so that the appropriate mailbox/personal greeting can be played. This allows users to change internal extension numbers, office locations, terminals and wiring ports without concern for the voice mail system. It also allows calls to be answered with the appropriate user greeting regardless of how many times they have been transferred before going to voice mail.

Figure 1:
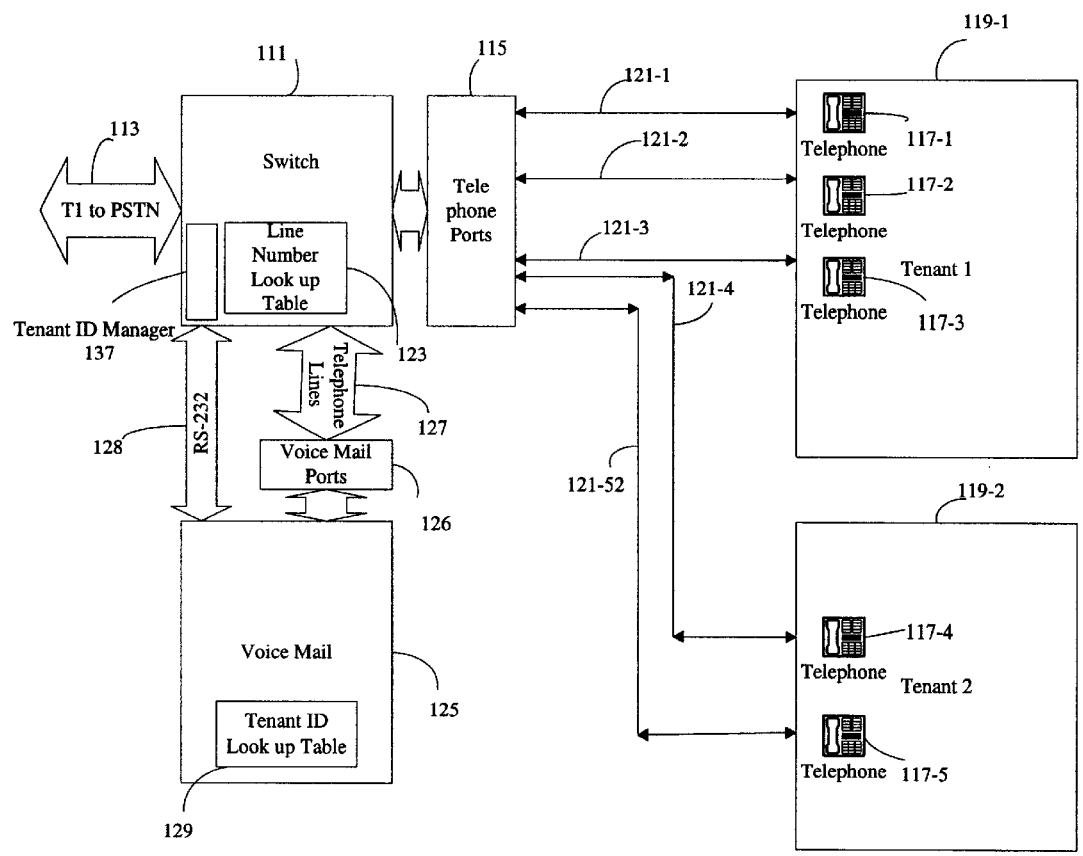
FIG. 1 is a block diagram of a switch and voice mail system suitable for implementing the present invention.

FIG. 1 shows a conventional switch 111 such as a PBX or a KSU. The switch has an external telephone line interface 113 to connect to the PSTN (Public Switched Telephone Network) such as a T1 connection to a CO. The switch also has a set of telephone ports 115 which connect to individual subscriber telephones 117-1, 117-2, 117-3, 117-4 and 117-5 at various tenants 119-1 and 119-2. While only 5 individual telephones are shown in FIG. 1, there can be any number of telephones per tenant. In addition, the switch can also connect to computer modem lines, Ethernet routers, video ports or any other type of communications interface. While only 2 tenants are shown, the switch may support any number of tenants depending on the capacity of the switch and any of the telephones may be allocated to any one of the tenants. Switching circuits well known in the art make the connections between the external telephone lines and the telephone ports.

The telephone ports are connected to each telephone through a twisted pair wired telephone line 121-1, 121-2, 121-3, 121-4 and 121-5. The telephone cabling is typically run through walls and ceilings of the building which, in the present example, is shared between the two tenants. However, a twisted pair connection is not required for the present invention, nor is a wired system. The telephone ports 115 may also be wireless ports which connect to mobile PCU's (Personal Communication Units) allocated to various subscribers. Similarly, the connection 113 to the PSTN may be a connection to a cellular or a radio telephone system using directional or omni directional antennas. It may also be a connection through some other type of wide area network such as the Internet or a satellite communication system. The nature of the connection to the PSTN and the nature of the connection to each individual telephone is not important to the present invention.

In a conventional telephone switch, such as that shown in FIG. 1, the connection to the PSTN will typically carry several different telephone lines or external numbers. These are the telephone numbers that are dialed by a calling party in order to access the individual telephone ports 117 through the switch through the PSTN. The external numbers can access a general receptionist or can constitute direct lines to a particular subscriber.

On the other side of the switch, each individual telephone, computer modem, video conferencing center or other communications node, is assigned a particular internal extension number. As mentioned above, these numbers may correspond to a particular wire connected to a telephone port at one end and to a telephone wall jack at another end or these internal numbers may be virtual extension numbers that are used to assign access to users in a less tangible way. So for example, with multiple users, each carrying PCU's, the channels assigned to each user may be virtual channels which correspond to frequencies, timeslots or codes that are dynamically allocated based on system usage. In this case, the internal extension number does not correspond to any fixed allocation of resources, but instead serves as an identification number for a particular communication unit. In any case, the switching circuits whether hardware or software make the connections.

The details of internal extension numbers, external telephone numbers and users and tenants are all stored in tables maintained at the switch such as a line lookup table 123. This table can take a variety of different forms. One approach is shown graphically in FIG. 2.

In addition, tenants and users of this system are served by a voice mail system 125. While a voice mail system is shown and described herein, an automated attendant system may also be used as an addition or an alternative. The same operations, connections and components apply equally to each except that an automated attendant does not normally record and store incoming messages. The voice mail system or automated attendant system is coupled to the switch through a number of telephone lines 127 which connect to ports, such as voice mail ports 126. The voice mail ports are typically carried on the voice mail system 125. The voice mail system is also coupled to the switch through another connector 128 shown in FIG. 1 as an RS-232 connector. As is well known in the art, this connector is coupled to interface ports both in the switch and in the voice mail system. FIG. 1 also shows a tenant identification lookup table 129 within the voice mail system. The voice mail system also includes an outgoing greeting store that contains stored greetings for each tenant and each user with its associated playback devices as well as an incoming message store that records incoming messages so that they can be retrieved and played back for the intended recipients later. These components are well-known in the art and not shown.

In one embodiment, telephone calls are routed by the switch to the voice mail system through the telephone lines and voice mail ports. The calls are accompanied by a tenant ID through an input of the auxiliary RS-232 line. This tenant ID is generated by a tenant ID manager 137 at the switch using the line number lookup tables of the switch. The voice mail system uses the tenant ID in its lookup table to determine an appropriate tenant greeting to play for the received call when it answers that call. A tenant identification and a user identification can be transmitted using an RS-232 protocol, a protocol proprietary to the particular switch, or any other type of signaling system. The data can be sent through the backplane of the switch, through the voice channel or over a special separate connector such as the RS-232 connector shown in the drawings. The particular protocol and methodology used for transmitting the tenant and user identification depends on the built-in protocols and architecture of the switch and voice mail system and not on the present invention.

There are also many other ways to send a tenant or a user identification. For systems which allow a separate digital control line, any number of other signaling or control channel data paths can be used on either the switch backplane or on peripheral cards including Ethernet, IP (Internet Protocol), or SS7. If no control or signaling channel is available or can be adapted, in-band signaling can be used in the voice channel. This can include different forms of modulated signaling using a variety of different types of protocols including DTMF (Dual Tone Multi-Frequency)

signals. In other scenarios, various kinds of infra-red, radio or wireless type communications can be used between the switch and the voice mail system. In a software environment, the signaling can be done by any of a number of different types of calls, requests or sub-routines including API's (Application Programming Interface), RPCs (remote procedure calls), etc.

The hardware system for the switch and voice mail of FIG. 1 is conventional. In one configuration, the switch consists of an equipment rack with a large number of separate cards. Some cards handle groups of telephone ports as an interface to the wired internal extension network. Other cards carry telephone ports as an external interface to, for example, a T1 line or a voice over IP network. Some cards carry switching circuits between the various ports. Still further cards handle network management and administration including the line number lookup table. Other cards can carry interfaces for digital signaling such as SMDI (Simplified Message Desk Interface), RS-232, Ethernet etc. The cards are typically coupled together through a backplane which can be built into the equipment rack. Or the cards may also use electrical or optical connectors coupling together the cards and the system. In some configurations, each telephone line has an analog connection and a digital connection through the backplane. The digital connection includes administration and log data, as well as identification information for each active telephone connection. In other configurations, the telephone lines within the switch are all digital connections and each port to a user includes a digital to analog converter. In this case, information about each active telephone call can be carried in the data for that telephone call or it can be carried on the digital backplane.

Similarly, the voice mail system can be constructed using a variety of hardware or software configurations well known in the art. In one configuration, the voice mail system is based on a conventional microcomputer architecture using a single central processor, a hard drive memory storage for messages and configuration tables and adapter cards coupled to a shared communications bus to receive telephone lines and constitute the voice mail ports shown in FIG. 1. Such a microcomputer architecture allows for a large variety of different communications interfaces including the RS-232 connector shown in FIG. 1. Higher bandwidth communications can be routed through token key network connections or Ethernet connections, for example, as well as through a variety of other digital and analog communications protocols.

In another configuration, the voice mail system is constructed as a separate card which plugs into the equipment rack occupied by the switch. The voice mail card connects to the same backplane as the cards of the switch. In this case, the voice mail ports can offer a connection similar to that offered by the telephone ports and can be coupled to the switching architecture using electrical or optical lines or directly through the backplane. Separate data connections such as the RS-232 connection shown in FIG. 1 can be coupled using separate wires or also through the backplane of the equipment rack. In another configuration, the voice mail system can exist as independent software modules running directly on the switch central processing unit or some other part of the switch hardware architecture. Such a configuration is illustrated for example, in FIG. 3.

In use, an outside caller will dial an appropriate telephone number to reach the desired business, either tenant 1 or tenant 2 or any of the other tenants which may share a particular switch. The telephone switch receives the call from the PSTN and through the switching circuits directs the call either to a voice mail port for automated handling or routing by an automated attendant feature, or to a particular intended telephone within either tenant 1 or tenant 2. This routing will be based on the called number. If the call is routed to a particular telephone and that telephone does not answer the call or is busy or in do-not disturb mode, the switch may route the call to another extension based on internal forwarding programming including to a voice mail port for further processing. The voice mail system will play an initial greeting that corresponds to the desired telephone extension (corresponding to a mailbox or a personal greeting) or tenant (corresponding to a system or a company greeting). The correct choice of the greeting to play will depend on the number that was called or the extension from which the call has been forwarded. Routing of calls by the switch and the associated line numbers can be better understood with reference to FIG. 2.

Figure 2:
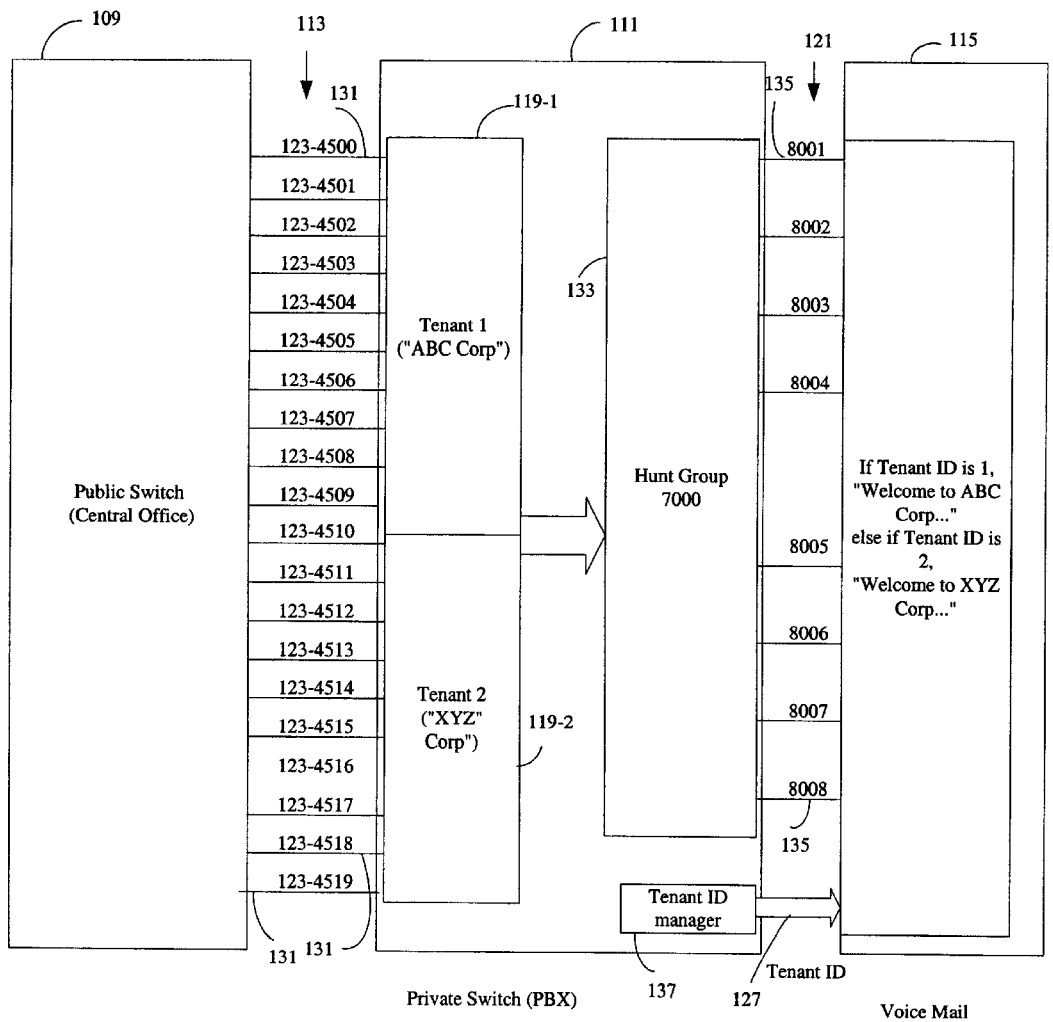
FIG. 2 is a functional diagram of a telephone number allocation scheme.

FIG. 2 shows a representation of the central office 109 with the various external telephone numbers from the T1 113 coupled to the private switch 111. In the example of FIG. 2, there are 20 telephone lines 131 and these have the telephone numbers 123-4500 to 123-4519. The telephone numbers have been allocated so that the first 10 numbers from 123-4500 to 123-4509 are connected to the first tenant 119-1 identified as ABC Corporation. The second ten lines from 123-4510-123-4519 are allocated to the second tenant 119-2 identified as XYZ Corporation. For purposes of operating the voice mail, all of these lines are assigned to the same hunt group 133, in this case identified as hunt group 7000. The hunt group in this example, is an extension number (7000) to which the call is forwarded. This extension allows the switch to hunt for a free extension within the assigned group (8001–8008).

Due to the shared hunt group, any of the external lines can be connected to any one of the voice mail ports from the voice mail system 115. The voice mail system is shown as having 8 ports 135 from 8001 to 8008. The switch, upon routing any one of the external calls on any one of lines 123-4500 to 123-4519 to any one of voice mail ports 8001 to 8008, will also supply a tenant ID using a separate connector 127. This tenant ID is generated by a tenant ID manager 137. The data from the tenant ID manager is applied to a lookup table at the voice mail system in order to select an appropriate greeting. This greeting, one for tenant 1 and the other for tenant 2, can be played to any one or more of the voice mail ports from 8001–8008.

The configuration shown in FIG. 2, can be applied to any external call regardless of the external telephone or line number. It will ensure that an appropriate greeting is played to that external caller when an automated attendant answers the call. The same principles can be applied even if the external call was to a direct inward dial (DID) line and then later was forwarded to voice mail. They can also be applied to internal calls between tenants.

Table 1 shows a representation of a line number lookup table 123. In table 1, there are two tenants, ABC and XYZ. These are assigned tenant identification numbers 1 and 2 respectively. The telephone numbers from 123-4500 to 123-4519 shown in Table 1 have been assigned to the tenants in the same way as shown in FIG. 2 and all of the external CO line numbers have been assigned to hunt group number 7000 as also shown in FIG. 2. In addition, Table 1 shows that the CO line numbers have been assigned to various different internal extension numbers which are associated with a particular user. As an example, CO line number 123-4500 is assigned to internal extension number 1001 which belongs to the receptionist for ABC Corporation. CO line number 123-4514 has been assigned to internal extension number 1011 which corresponds to user C. Doe. This same user has also been assigned CO line numbers 123-4517 and 123-4519.

The assignments shown in Table 1 are intended as an illustration only. Any number of CO line numbers can be assigned to any number of different tenants or users. Internal extension numbers can be assigned to several different CO line numbers and several different internal extension numbers can be assigned to a single CO line number. The names of the users given in the last column of table 1 are provided as a convenience for the system administrator, and of course, are not required for the operation of the switch.

TABLE 1

| Tenant Name | Tenant ID | CO line number | Internal Ext. Number | User Name | Routed to hunt group number |
| --- | --- | --- | --- | --- | --- |
| ABC | 1 | 123-4500 | 1001 | Reception A | 7000 |
| | | 123-4501 | 1002 | A. Jones | 7000 |
| | | 123-4502 | 1003 | C. Smith | 7000 |
| | | 123-4503 | 1004 | E. Doe | 7000 |
| | | 123-4504 | 1001 | Reception A | 7000 |
| | | 123-4505 | 1001 | Reception A | 7000 |
| | | 123-4506 | 1005 | R. Jones | 7000 |
| | | 123-4507 | 1006 | J. Smith | 7000 |
| | | 123-4508 | 1006 | J. Smith | 7000 |
| | | 123-4509 | 1007 | B. Smith | 7000 |
| XYZ | 2 | 123-4510 | 1008 | Reception X | 7000 |
| | | 123-4511 | 1008 | Reception X | 7000 |
| | | 123-4512 | 1009 | S. Jones | 7000 |
| | | 123-4513 | 1010 | S. Smith | 7000 |
| | | 123-4514 | 1011 | C. Doe | 7000 |
| | | 123-4515 | 1012 | G. Doe | 7000 |
| | | 123-4516 | 1013 | R. Doe | 7000 |
| | | 123-4517 | 1011 | C. Doe | 7000 |
| | | 123-4518 | 1009 | S. Jones | 7000 |
| | | 123-4519 | 1011 | C. Doe | 7000 |

Table 2 shows, as is illustrated in FIG. 2, that hunt group number 7000 is assigned to all of the internal extension numbers that correspond to voice mail boxes. The voice mail ports are provided internal extension numbers from 8001 to 8008.

TABLE 2

| hunt group number | Routed to internal number |
| --- | --- |
| 7000 | 8001 |
| | 8002 |
| | 8003 |
| | 8004 |
| | 8005 |
| | 8006 |
| | 8007 |
| | 8008 |

In one version of a voice mail system, the voice mail ports all are provided on a card which emulates a set of digital telephone lines. These digital telephone lines spoof all of the necessary functionality that is provided by digital telephones 117. With this configuration a telephone call which has been directed to a user's telephone 117 (digital, analog, hybrid, etc.) can then be forwarded to a voice mail port using the standard functionality of the switch which forwards calls from one extension to another. Forwarded calls to voice mail ports existing as emulated digital phones are handled just like any other type of voice mail port (typically analog), although digital phones normally are capable of receiving a wealth of data/intelligence directly from the switch.

In many such switches, the telephone lines have both a digital signaling stream and a digital voice stream both carried on the backplane. The digital signaling stream includes instructions for telephone subscriber units such as instructions to flash the lights, ring the telephone, show a message light, transfer the line to another extension etc. One such digital signaling system is SMDI. The SMDI protocol sends called and calling party information as well as a code indicating the reason the call was forwarded (presumably to a voice mail port) over an RS-232 (i.e. serial) cable. An alternative architecture is to provide a digital voice stream in which headers contain these kinds of signaling instructions and the voice information is also carried digitally. The digital information can be used to allow the voice mail system to determine which user's voice mail box to use for recording a message. However, it cannot be used to determine to which tenant the call corresponds, unless the call was forwarded from a call for that tenant and the voice mail system has a duplicate table of internal extension numbers and tenant names, such as Table 1. In other such architectures, digital signaling information is conveyed through other types of digital interfaces and may also be optional. For example, with some switches, digital signaling and control information is provided using an RS-232 protocol that is supported by unique cards that can be added to the switch system. In order to support these switch systems a similar card or utility can be added to the voice mail system.

Figure 3:
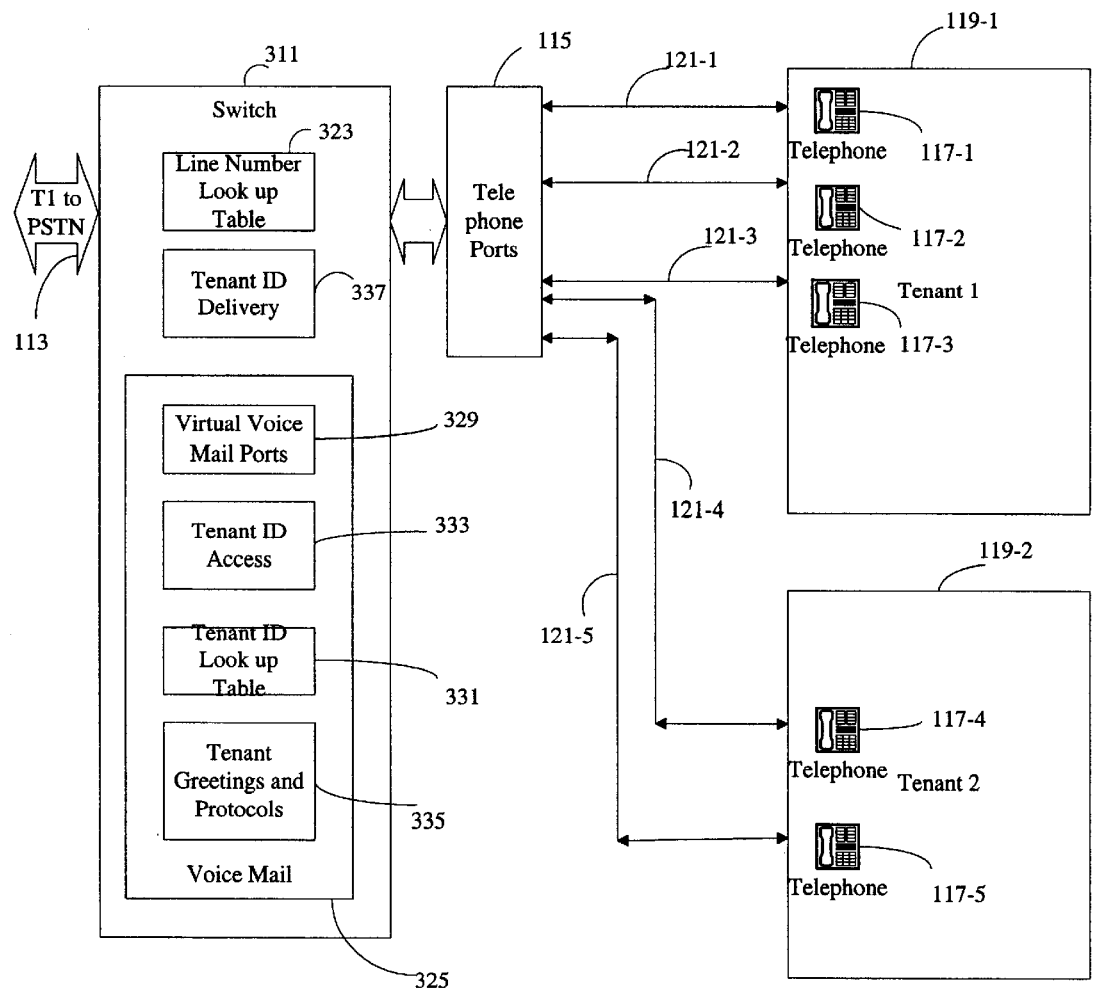
FIG. 3 is a block diagram of a switch and a software-based voice mail system suitable for implementing the present invention.

FIG. 3 shows a switch and voice mail system in which the voice mail system is integrated into the software of the switch. The switch can be built in any of a variety of different software configurations. In one embodiment, an operating system, for example Vx Works, can be used to allow different modules of the system to be constructed and compiled separately and then integrated later in binary form. As with FIG. 1, the switch 311 is coupled 113 to the PSTN 109. It includes a number of telephone ports 115 which connect the radio or wired connections 121 to individual telephones 117 of each tenant 119. Inside the switch 311, there is a line number lookup table 323 and a tenant ID manager 337. When a telephone call is to be routed to voice mail, the tenant ID delivery module 337 generates a tenant ID from the line number lookup table and provides that to the voice mail module 325. The voice mail module receives a telephone call at virtual voice mail ports 329 and uses a tenant ID access module 333 to obtain the tenant ID from the tenant ID delivery module 337. The tenant ID access module 333 applies this tenant ID to a tenant ID lookup table 331. This is then used to retrieve a tenant greeting and any particular system control protocols in a tenant greetings module 335. Putting these modules together allows voice mail functionality to be provided in the switch software 311.

In particular, while the voice mail module is specially adapted to provide the functionalities described above using its unique modules, the switch requires only one unique additional module which is the tenant ID delivery module 337. This module can be constructed independently of the rest of the switch software. It requires only a trigger event and then a simple direct access to the line lookup table. Using this one additional module, all of the voice mail functionality can be provided including playing of the proper greeting to an outside caller with knowledge of the appropriate tenant.

All of the details discussed above with respect to tenant identification can also be applied to user identification. As can be seen from Table 1, a user name can be derived from an internal extension number. The user name can be used similar to a tenant identification to retrieve greetings and protocols set or established by that user for use in answering telephone calls directed to that user. Providing a separate user identification allows appropriate greetings to be used even if a telephone call has been routed from several different users before arriving at the voice mail ports of the voice mail system.

Figure 4:
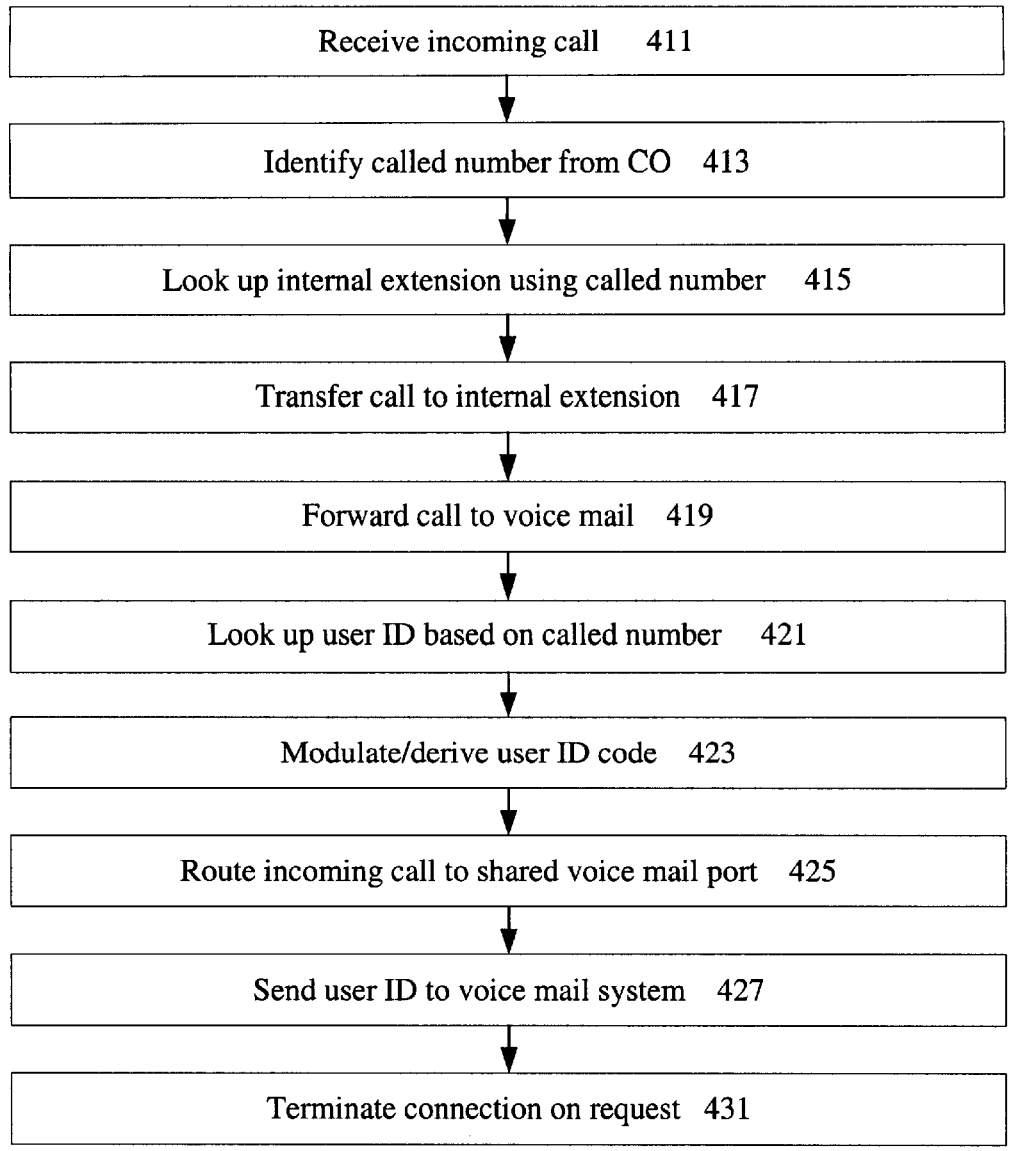
FIG. 4 is a flow diagram of a voice mail process as implemented by the switch.
Figure 5:
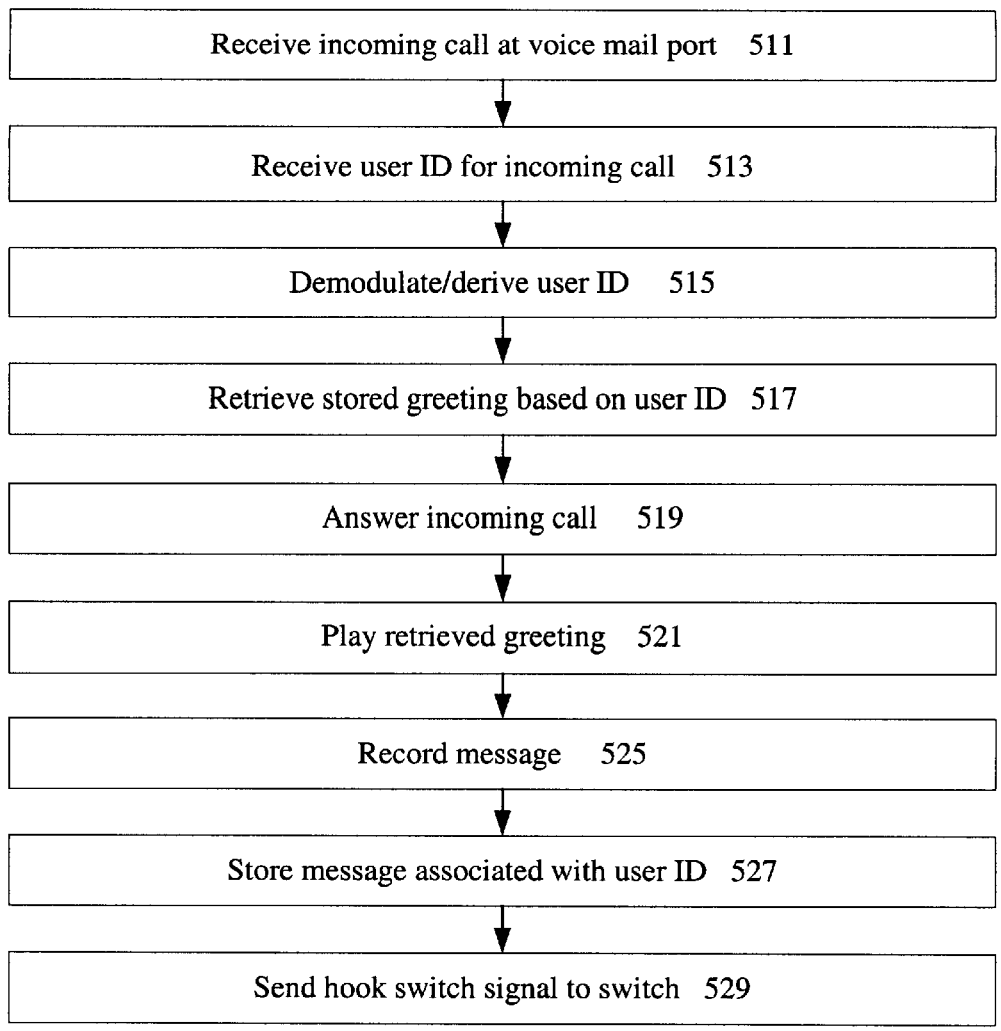
FIG. 5 is a flow diagram of a voice mail process as implemented by the voice mail system.

The features of the present invention can be further understood with reference to the process illustrated in FIG. 4. FIG. 4 restates many of the ideas discussed above with respect to FIGS. 1, 2 and 3. In FIG. 4, "user ID" will be used to refer to identifying a particular subscriber or on the telephones 117 as well as to a tenant 119, which can be thought of as a group of users or subscribers. As is well-known in the art, both individuals and tenants can have a unique greeting, a set of forwarding options and a voice mail box. A voice mail exchange begins when an incoming call is received 411. The called number from the central office is identified by the switch 413. The switch can then look up an internal extension using the called number 415. The internal extension may be an internal extension such as 1001 of Table 1 which goes to a reception desk or it could be an extension such as 8001 which goes directly to voice mail. The switch can also use other functions to determine correct routing of the call including "do not disturb" and forwarding instructions as is well-known in the art. The call is then transferred to the internal extension 417. In many instances, if this is not a voice mail extension the call will be forwarded to voice mail 419.

When the call is forwarded to voice mail, the switch looks up a user identification based on the called number 421. It modulates or derives a user identification code based on that called number 423, routes the incoming call to a shared voice mail port 425 and sends the modulated or derived user identification code to the voice mail system 427. The voice mail system will handle the call and at some point indicate that the call is to be terminated. Typically, the voice mail system sends a hook switch signal. The connection will then be terminated on this request 431.

From the voice mail system's perspective, its activity, according to the present invention, begins when it receives an incoming call at any one of its voice mail ports 511. With this incoming call it will also receive a user identification for the incoming call 513. The voice mail system will demodulate or derive a user identification from that signal 515 and retrieve a stored greeting based on the user's identification 517. At that point, the voice mail system can answer the incoming call 519 and play the retrieved greeting 521. The voice mail system can use the user ID to relate to a voice mail box and the play the associated mailbox/personal greeting for the call. If the caller desires to record a message in response to the retrieved and played greeting, the voice mail system will record that message 525 and then store the message in association with the user ID 527. At the completion of the transaction, the voice mail system will send a hook switch signal to the switch 529 and the switch will terminate the connection.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a voice mail system for a shared switch, it can be applied to a wide variety of shared voice mail or generic messaging systems in which identification information can be exchanged. Such systems include voice over IP, data switched and router based systems. The telephone calls may include voice, video, music, broadcast and data calls. The present invention can be applied to fixed telephone terminals as well as to low and high mobility voice and data terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:

receiving an incoming call at a port for an automated telephone attendant, the call having a called number associated with one user of a plurality of users;

receiving a user identification that identifies the one user among the plurality of users for the incoming call;

retrieving a stored greeting based on the user identification;

answering the incoming call; and playing the retrieved greeting for the answered call, wherein the user identification corresponds to a voice mail box shared by a plurality of telephone subscribers.

2. The method of claim 1, wherein receiving an user identification comprises receiving a tone sequence at the port, decoding the tone sequence, and deriving the user identification from the decoded tone sequence.

3. The method of claim 1, wherein the tone sequence is a DTMF tone sequence transmitted to the port over the same transmission line as the incoming call.

4. The method of claim 1, wherein receiving a user identification comprises receiving an identification message through a digital interface.

5. The method of claim 4, wherein the digital interface comprises a digital backplane connection to a switch from which the incoming call was received.

6. The method of claim 1, wherein receiving an incoming call comprises receiving a user incoming call from a switch and wherein receiving an identification comprises receiving the user identification from the switch.

7. The method of claim 1, wherein receiving an incoming call comprises receiving the call at any one of a plurality of ports of the automated telephone attendant regardless of the user identification.

8. The method of claim 7, wherein the plurality of ports is shared among different users and wherein the one of the plurality of ports consists of a next available port.

9. A method comprising:
receiving an incoming call at a port for an automated telephone attendant, the call having a called number associated with one user of a plurality of users;
receiving a user identification that identifies the one user among the plurality of users for the incoming call;
retrieving a stored greeting based on the received user identification;
answering the incoming call;
playing the retrieved greeting for the answered call; and
recording a message after playing the retrieved greeting, storing the message and associating the message with the received user identification.

10. An automated telephone attendant comprising:
a port to receive an incoming call, the call having a called number associated with one user of a plurality of users;
an input to receive a user identification that identifies to one user among the plurality of users for the incoming call;
a greeting storage to contain stored greetings retrievable based on the received user identification;
a telephone circuit interface of the port to answer the incoming call; and
a playback device to play a retrieved greeting for the answered call based on the received user identification; and
a recording device to record a message after playing the retrieved greeting, and to store the message in association with the received user identification.

11. The attendant of claim 10, wherein the input comprises a DTMF demodulator coupled to the telephone circuit interface.

12. The attendant of claim 10, wherein the input comprises a digital interface.

13. The attendant of claim 10, further comprising a plurality of ports shared among different users and wherein calls are received a next available one of the plurality of ports.

14. A method comprising:
receiving an incoming call having a called number;
retrieving a user identification to identify one of a plurality of users for the incoming call based an the called number
routing the incoming call to a port of an automated attendant system that is shared by the plurality of users; and
sending the user identification to the automated attendant system in association with the routed call.

15. The method of claim 14, wherein retrieving a user identification comprises applying the called number of the incoming call to a lookup table to determine the user identification.

16. The method of claim 14, wherein sending the user identification comprises sending an identification message through a digital interface.

17. The method of claim 14, wherein routing the incoming call comprises routing the call to any one of a plurality of ports of the automated attendant system regardless of the user identification.

18. The method of claim 17, wherein the plurality of ports is shared among the plurality of users and wherein the one of the plurality of ports consists of a next available port.

19. A machine-readable medium having stored thereon data representing instructions which, when executed by a machine, cause the machine to perform operations comprising:
receiving an incoming call having a called number;
retrieving a user identification to identify one of a plurality of users for the incoming call based on the called number;
routing the incoming call to a port of an automated attendant system that is shared by the plurality of users; and
sending the user identification to the automated attendant system in association with the routed call.

20. The medium of claim 19, wherein retrieving a user identification comprises applying the called number of the incoming call to a lookup table to determine the user identification.

21. The medium of claim 19, wherein sending the user identification comprises sending an identification message through a digital interface.

22. A telephone switch comprising:
an external telephone line interface to receive an incoming call having a called number;
a user identification look up table to identify one of a plurality of users for the incoming call based on the called number;
a switching circuit to route the incoming call to a port of an automated attendant system that is shared by the plurality of users; and
a digital interface to send the user identification to the automated attendant system in association with the routed call.

23. The switch of claim 22, wherein the digital interface comprises a DTMF tone sequence generator to send a DTMF tone sequence over the voice channel of the routed call.

24. The switch of claim 22, wherein the digital interface comprises a digital backplane coupled to the switch and to the automated attendant.

* * * * *

UNITED STATES PATENT AND TRADEMARK OFFICE
CERTIFICATE OF CORRECTION

PATENT NO. : 6,829,335 B2
DATED : December 7, 2004
INVENTOR(S) : Colemon

It is certified that error appears in the above-identified patent and that said Letters Patent is hereby corrected as shown below:

Column 11,
Line 56, delete "an" and insert -- on --.

Signed and Sealed this

Twenty-eighth Day of June, 2005

JON W. DUDAS
*Director of the United States Patent and Trademark Office*